(No Model.) 2 Sheets—Sheet 1.
C. M. BRIDGES.
SELF MEASURING LIQUID TANK.
No. 543,169. Patented July 23, 1895.
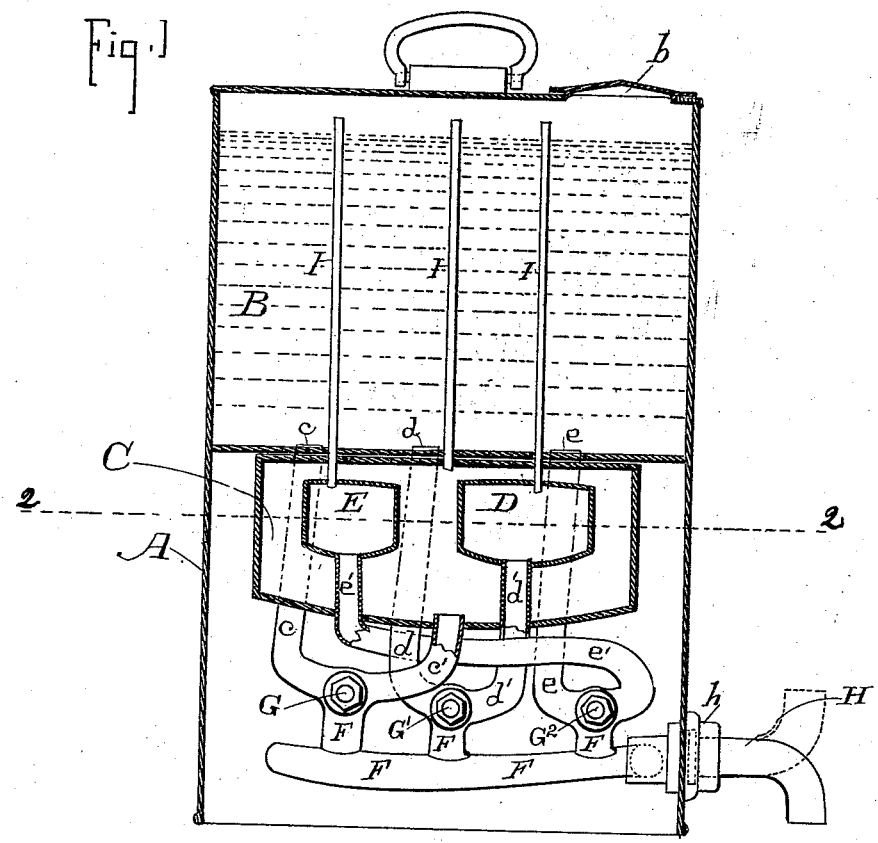
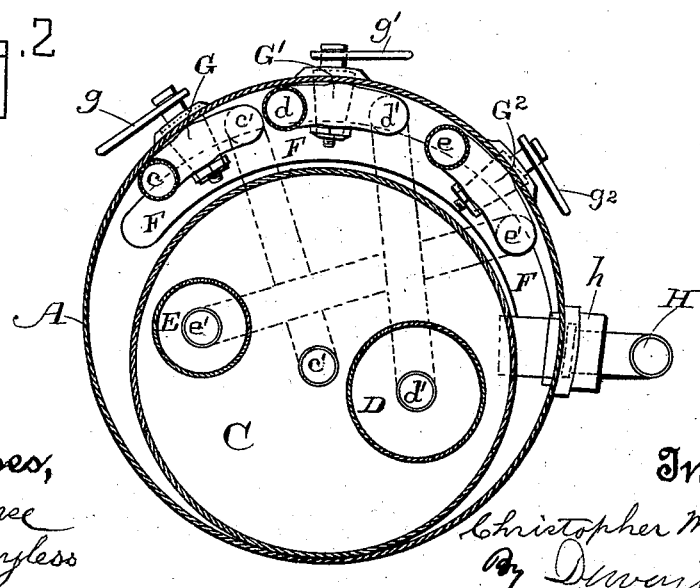
Witnesses,
Inventor
Christopher M. Bridges (No Model.) 2 Sheets—Sheet 2.
C. M. BRIDGES.
SELF MEASURING LIQUID TANK.
No. 543,169. Patented July 23, 1895.
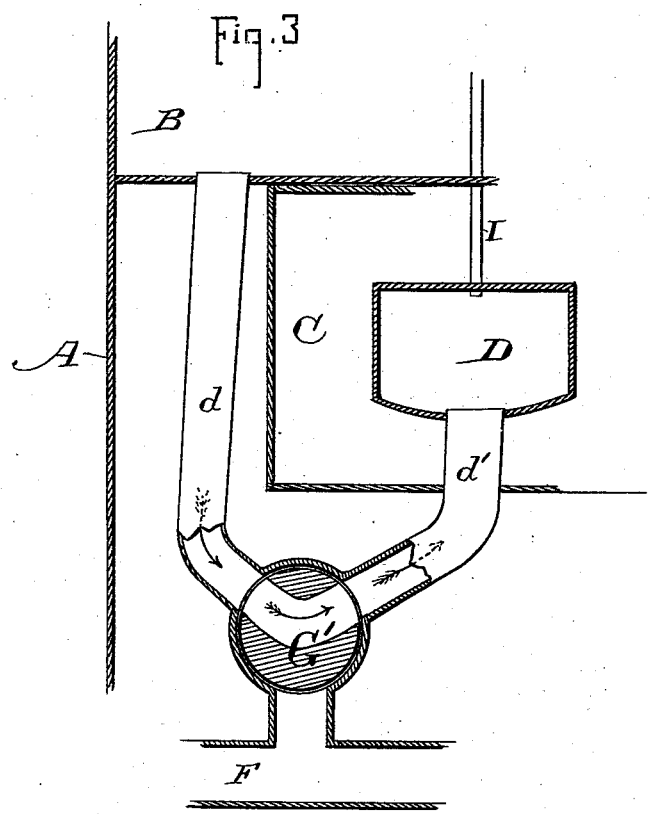
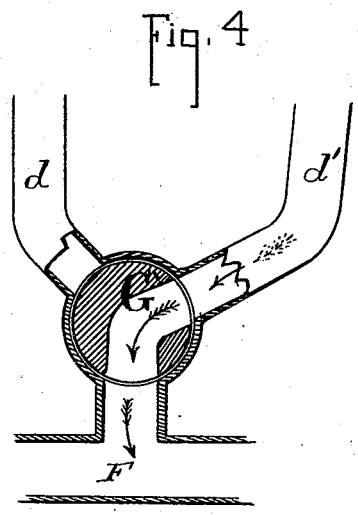
Witnesses:
Inventor,
Christopher M. Bridges

United States Patent Office.

CHRISTOPHER M. BRIDGES, OF SEATTLE, WASHINGTON, ASSIGNOR OF ONE-HALF TO JOHN S. FANNING, OF SAN FRANCISCO, CALIFORNIA.

SELF-MEASURING LIQUID-TANK.

SPECIFICATION forming part of Letters Patent No. 543,169, dated July 23, 1895.

Application filed March 14, 1895. Serial No. 541,799. (No model.)

*To all whom it may concern:*

Be it known that I, CHRISTOPHER M. BRIDGES, a citizen of the United States, residing at Seattle, King county, State of Washington, have invented an Improvement in Self-Measuring Liquid-Tanks; and I hereby declare the following to be a full, clear, and exact description of the same.

My invention relates to the class of self-measuring tanks adapted for the disbursement of various liquids, but especially for the measuring of oil.

My invention consists in the novel arrangement and construction of the measuring-vessels, their connections with the main supply-vessel, their connections with the exterior, and the cocks controlling said connections, which I shall hereinafter fully describe and specifically claim.

The object of my invention is to provide a simple, accurate, and effective tank for measuring liquids, especially oil, and one which is adapted by the turning of any of a given number of cocks to deliver precisely the amount of liquid called for.

Referring to the accompanying drawings, Figure 1 is a vertical section of my self-measuring tank. Fig. 2 is a horizontal section on line 2 2 of Fig. 1. Fig. 3 is a diagram section showing the three-way cock in position to open communication between main supply-tank and one of the measuring-vessels. Fig. 4 is a similar view showing the communication open between one of the measuring-vessels and the discharge-pipe.

The main shell A of the vessel contains in its upper portion a supply-tank B, access to which is had through a suitably-controlled opening $b$ in its top.

In the lower portion of the shell is a measuring-vessel C, within which is confined a second measuring-vessel D, and also a third measuring-vessel E, and as many more as may be desired.

In practice I would make the smallest vessel E to have a capacity of one quart, and the vessel D to have a capacity of half a gallon and the containing-vessel C to have a remaining capacity of four and one quarter gallons, this arrangement being such as to make a united capacity of five gallons, which in practice will be found very convenient in the selling of oil.

Leading downwardly from the bottom of the main supply-tank B is a pipe $c$, and leading out from the largest measuring-vessel C is a pipe $c'$, and these two pipes are connected with a common outlet-pipe F by means of a three-way cock G, having an operating-handle $g$ on the outside of the shell. This three-way cock consists of a suitable barrel with an oscillating plug, said barrel and plug having ports arranged in such a manner that when the plug is turned to a certain position the communication between the pipes $c$ and $c'$ shall be open, while the communication with the discharge-pipe shall be closed, and thereupon the oil will pass down from the main supply-tank through the pipe $c$, cock G, and pipe $c'$ into the larger measuring-vessel C, and when said plug is turned to another position the communication between the pipes $c$ and $c'$ is cut off, while the communication between the pipe $c'$ and the common discharge-pipe F is opened, and the oil will pass from the measuring-vessel C directly through the discharge-pipe F. This discharge-pipe is provided with a draw-off faucet H on the outside of the shell. From the main supply-tank B extends also downwardly a pipe $d$, which communicates through a three-way cock G' with a pipe $d'$ leading to the measuring-vessel D, and also with the common discharge-pipe F, and said cock G' has an exterior handle $g'$. In like manner a pipe $e$ extends downwardly from the main tank B to a three-way cock $G^2$, which controls a communication through a pipe $e'$ with the measuring-vessel E, and also with the common discharge-pipe F.

The draw-off faucet H of the common discharge-pipe F is preferably coupled by means of a ground joint at $h$, so that its pipe may be turned upwardly when not in use, thereby avoiding any drip, and may be turned downwardly again when it has to be used.

The operation of the device is as follows: The supply of oil is kept in the main vessel B. By opening the cock G in such a way as to throw the pipes $c$ and $c'$ into communication oil will pass down into and fill the largest measuring-vessel C, and by opening, also, the cocks G' and $G^2$, thereby throwing the pipes $d$ and $d'$ and $e$ and $e'$ into communication, respectively, the oil will also pass down into and fill the measuring-vessels D and E. When, now, a customer applies for, say, one quart of oil, the cock $G^2$ is so turned as to cut off the communication between the pipes $e$ and $e'$ and to open the communication between the pipe $e'$ and the common discharge-pipe F, and then upon opening the drawing-off faucet H the measuring-vessel E will be emptied of its contents, which will be the desired quart. In a similar manner a half a gallon can be delivered, or four and a quarter gallons, or any other amount into which the measuring-vessels may be divided; or if five gallons be desired at once then by opening the three cocks the desired amount will be obtained.

Rising from each of the measuring-vessels into the main supply-tank and extending to a point above the level of the oil therein are the air-vents I, which are necessary to permit the free flow of the oil into and from the measuring-vessels.

Having thus described my invention, what I claim as new, and desire to secure by Letters Patent, is—

1. A self measuring vessel comprising a supply vessel, an independent measuring vessel in the lower portion of the shell thereof, a second measuring vessel within the main measuring vessel, and of a different capacity, a pipe leading from the supply vessel and connecting with a pipe leading from the main measuring vessel, and a second pipe leading from the main supply vessel and connected with a pipe leading from the junction of both series of pipes, and a single discharge pipe in connection with the discharge of said series of pipes and controlled by said cocks.

2. An improved self measuring tank comprising a main supply vessel, a main measuring vessel of known capacity, in the lower portion of the shell thereof, other vessels of known and different capacities contained within the main measuring vessel, a pipe leading from the main supply and connected with a pipe leading from the main measuring vessel, other pipes leading from the main supply vessel and connected with pipes leading from the interior measuring vessel through the wall of the main measuring vessel, cocks at the junction of each pair of pipes and a single discharge pipe into which the contents of the one or all of the measuring vessels may be discharged singly or collectively.

In witness whereof I have hereunto set my hand.

CHRISTOPHER M. BRIDGES.

Witnesses:
S. H. NOURSE,
JESSIE C. BRODIE.